INVENTOR.
JAMES W. ROSS
BY
ATTORNEY

United States Patent Office 3,429,785
Patented Feb. 25, 1969

3,429,785
ORGANIC LIQUID ION-EXCHANGER ELECTRODE AND METHOD OF USING SAME
James W. Ross, Newton, Mass., assignor to Corning Glass Works, Corning, N.Y., a corporation of New York
Filed Aug. 17, 1964, Ser. No. 390,016
U.S. Cl. 204—1                25 Claims
Int. Cl. B01k 3/00

ABSTRACT OF THE DISCLOSURE

An electrode for determining the concentration of ionic species in an aqueous solution wherein the sensing portion is a liquid organic phase containing an organic ion exchange material capable of exchanging ions with the aqueous solution and the organic phase being substantially immiscible with the aqueous solution.

---

The present invention relates to the measurement of the concentration of ionic species in solution, and more particularly to methods for determining the activity or concentration of ionic species and novel apparatus for use in such determination.

For the electrometric determination of ionic concentrations in solutions, a number of devices are known, and typically include a reference electrode and an ion-sensitive electrode which when simultaneously immersed into the same body of solution, constitute an electrochemical cell, across the electrodes of which a potential develops approximately proportionately to the logarithm of the activity or the concentration in the solution of ions to which one of the electrodes is sensitive. An electrometric device, usually either a direct reading circuit or a null-balance potentiometric circuit is employed for measuring the EMF between the electrodes.

A large number of various ion-sensitive electrodes are known. For example, electrodes sensitive to hydrogen ions have variously been formed of such materials as iridium, antimony, quinhydrone, platinum-hydrogen, and most commonly, glass made of a number of various constituents. Glass electrodes sensitive to or responsive to other cations are also well known. For instance, glasses responsive to respectively sodium and potassium have been described in the patent literature. Significantly, such prior art electrodes are primarily sensitive to monovalent ions. It is believed that these glass electrodes function primarily by exchange of ions at the interface between the glass and the solution under test and not as the result of an electron exchange, i.e. a redox process.

It is further postulated that the electrode preference for monovalent ions arises, at least in part, because the electrode material is solid. The mobility, particularly of polyvalent ions, is limited in the solid, which is a substantially rigid lattice structure, even though the glass may include ion-exchange sites adequate both spatially and electrically to accept polyvalent ions. And while glass electrodes have met with considerable acceptance because of their relative insensitivity to either reducing or oxidizing agents in the test solution, the sensitivity thereof has been limited to cations and, indeed, it has been urged on theoretical grounds that such electrodes cannot exhibit anionic sensitivity.

A principal object of the present invention is, therefore, to provide an electrometric method and apparatus for determining concentrations of ionic species in solution, and particularly for determining concentrations of polyvalent ionic species. Another important object of the present invention is to provide novel electrodes preferentially sensitive or responsive to such ionic species. Yet other objects of the present invention are to provide such novel electrodes which are responsive to polyvalent cations; and to provide such electrodes which are responsive to anions.

To effect the foregoing and other objects appearing hereinafter, the present invention contemplates electrometric determinations employing electrodes which comprise barrier means across which, responsively to an ionic species, it is intended to develop the requisite potential, such barrier means comprising, in continuous phase, an ion-exchanger liquid.

Liquid ion-exchange, as the concept and variations of the phrase are used herein, is intended to refer to a liquid system that apparently operates by interchange of ions at an interface between a first liquid, for example, an aqueous solution, and a second liquid, such as an organic phase which is substantially immiscible with the first, there being negligible distribution of the first and the second liquid phases in one another. The interchange or ion-exchange is believed to depend upon an extraction process involving a metathetical reaction between the ions in the exemplary aqueous phase and ion-exchanger material in the solvent, which latter can be considered as the extractant phase. The extraction system of an ion-exchanger liquid, whether the latter is a liquid ion-exchanger per se or an organic solvent having ion-exchanger material dissolved therein, can be distinguished from other extraction systems such as extraction by neutral reagents such as ethers, esters, phosphine oxide, and by solid ion-exchangers. The latter are readily distinguishable inasmuch as when used with aqueous solutions they are highly hydrated and generally exhibit low selectivities as exchangers when so hydrated. On the other hand, ion-exchanger liquids, as generally contemplated by the present invention, and liquid ion-exchangers specifically, are substantially anhydrous, and are fully operative in this condition.

Further objects of the present invention are to provide novel electrodes in which an ion-sensitive barrier comprises a continuous liquid phase including an organic ion-exchanger and a mediator for attenuating the effect of said exchanger; to provide a novel electrode of the type described in which the mediator is an organic liquid which is substantially immiscible with those solutions whose ionic content is intended to be measured or determined; to provide novel electrodes of the type described wherein said ion-exchanger is a cation exchanger.

Yet other objects of the present invention are to provide a method for electrometrically determining the concentration of divalent cations in aqueous solution; to provide a method of the type described particularly for the determination of the calcium content of such solutions; to provide electrometric apparatus for measuring the divalent cation content of a solution and for providing a direct indication of the relative weight ratio of such content to the solution; and to provide an electrometric apparatus having an input transducer providing an electrical signal responsively to the concentration of calcium ions in a test solution, and a read-out device responsive to said signal for indicating said content and calibrated in terms of the calcium ion concentration determined as a proportional part by weight of the test solution.

The terms, "liquid," "solid," "immiscible," and the like, which are used herein with reference to physical properties of materials, are to be understood as referring to such properties as they exist under substantially normal conditions, such as room temperatures and atmospheric pressures. For example, the term "solid" then refers to a state wherein, under the foregoing normal conditions, the elements of a matrix or lattice structure exhibit spatial orientation which is substantially static or fixed over ordinary time periods during which the property and will in part appear hereinafter. The invention accordingly comprises the processes involving the several steps and the relation and order of one or more of such steps and the relation and order of one or more of such steps with respect to each of the others, and the apparatus and compositions possessing the features, properties and relation of elements which are exemplified in the following detailed disclosure and the scope of the application all of which will be indicated in the claims.

For a fuller understanding of the nature and objects of the present invention, reference should be had to the following detailed description taken in connection with the accompanying drawings wherein.

Figure 5:
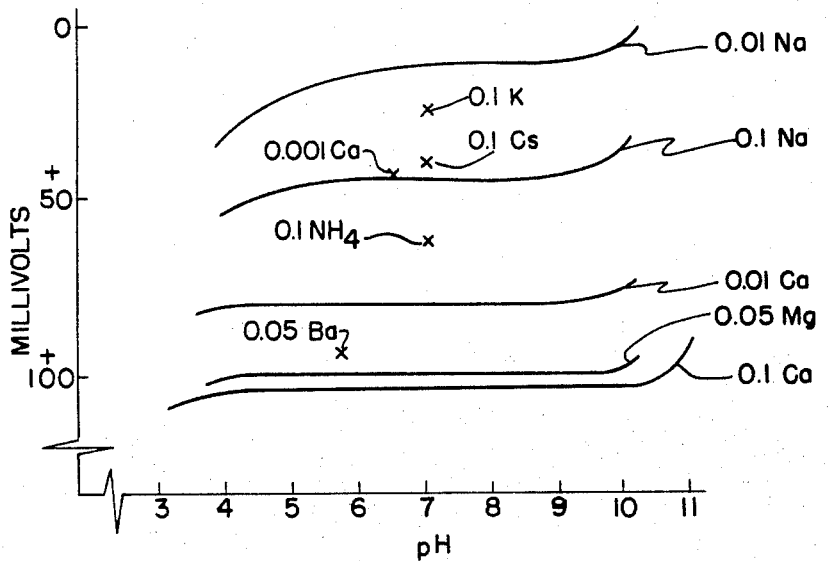
Figure 6:
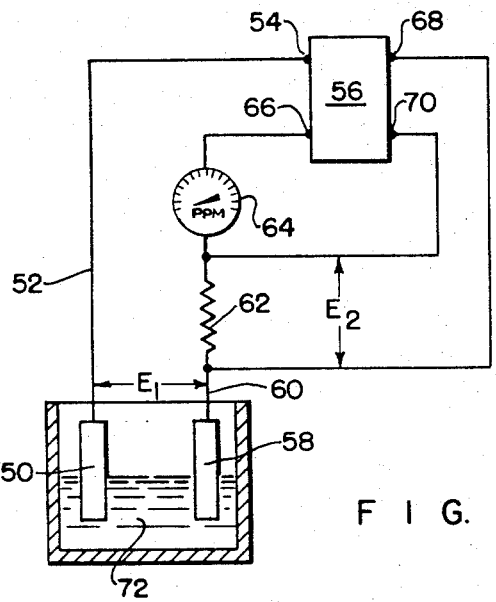

FIG. 5 is a graphical representation showing the responsivity, in terms of potential, of an electrode embodying the principles of the present invention, when tested in a number of standardized solutions of different cation content of different molarities over a wide range of solution pH; and FIG. 6 is a diagrammatical representation of an apparatus for carrying out the method of the present invention and incorporating therein an electrode embodying the principles of the present invention.

The present invention is intended to provide method and means for determining electrometrically the concentration of ions in solution, and involves as an essential part thereof the use of an ion-sensitive electrode in an electrometric cell having the following generalized formula:

Electrode (s); ion-exchanger/solution under test/bridge; ref. electrode

As the electrode in contact with the ion-exchanger liquid and thereby forming the ion-sensitive electrode assembly, a number of known structures can be employed. However, it is preferred, out of consideration of the stability of contact potential, to use the well-known Ag-AgCl electrode. As the reference electrode and bridge, either a standard calomel type or Ag-AgCl type assembly is appropriate.

A large number of ion-exchange materials can be used, both of the anionic and cationic type. The ion-exchange material can be liquid per se under normal conditions. Among typical cation-exchangers of the liquid type are a number of normally liquid organophosphoric acids, such as di-2-ethylhexylphosphoric acid and either or both of the mono and di forms of n-butyl phosphoric acid and amyl phosphoric acid.

Certain carboxylic acids are known liquid cation-exchangers, such as, for example caproic acid and caprylic acid. Similarly, liquid cation-exchangers among the perfluoro-carboxylic acids are typified by perfluorobutyric acid.

A number of liquid anion-exchangers are also known, particularly the primary, secondary and tertiary amines, typical examples of each of which are respectively N-trialkylmethylamine, N - lauryl-N-trialkylmethylamine, and N,N,N-triisoocytylamine.

In addition to those ion-exchangers which under normal conditions of temperature and pressure are liquid, other normally solid exchangers are useful in the present invention when dissolved in an appropriate liquid. For example, among the useful solid ion-exchangers are the known solid amines, quarternary ammonium salts, pyridinium salts, alkyl and aryl phosphates and phosphites, sulfonates and many others. Typical examples of such solid exchangers are dioctadecylamine, tetraheptyl ammonium iodide, cetyl pyridinium chloride, nonadecyl phosphoric acid, and dinonylnaphthalene sulfonic acid.

The exchanger materials preferred in one important aspect of the invention are characterized in possessing the property of being highly soluble (and thus, where applicable, highly miscible) in a first solvent, and substantially insoluble in a second solvent which is the solution under test in the generalized formula above. Typically, where the solution under test is aqueous, the exchanger material selected then possesses, as a part of the exchanger ion, an organic group or groups (alkyl, aryl, aralkyl or the like) of sufficient size (preferably a chain of six or more carbon atoms) or nature so as to provide a comparatively massive ion which is relatively soluble in an organic solvent but exhibits substantial insolubility in the aqueous solution.

The nature of the first solvent in which the exchanger (whether the latter is normally liquid or solid) is soluble is quite significant, and its liquidity provides ready formation of a continuous phase barrier or interface.

The selectivity of the ion-exchanger material for a predetermined ion is believed to arise out of the nature of the sites in the exchanger which have a high affinity for that particular ion (i.e. the exchanger constant of the exchanger) and also because that particular ion or the combination of ion and site has a relatively high mobility in the exchanger material. In an ion-exchanger in liquid form, whether liquid per se or by virtue of solution in a solvent, the mobility of the ion and ion site are considerably higher than will be found in the solid phase alone. The use of a solvent liquid with exchanger material provides several advantages over the direct use of a liquid ion-exchanger, alone and has functions other than merely solvent use with solid ion-exchangers. For example, by use of an appropriate mediator liquid, one can adjust the dielectric constant of the mixture thus formed, can adjust the mobility of the sites roughly in accordance with the viscosity of the mediator liquid, can adjust site density in accordance with the ratio of mediator liquid to ion-exchanger, and of course, the nature of the ion-sensitive site can be varied according to the type of ion-exchanger employed with a particular mediator liquid. The ion-exchange reaction can thus be mediated in accordance with the solvent or mediator liquid selected. The mediator liquid, whether functioning as a solvent for a normally solid ion-exchanger material, or as a diluent or mediator for an ion-exchanger liquid, preferably has a high enough dielectric constant, i.e. the volume resistivity of the ion-exchanger liquid will be sufficiently low, such that the impedance presented to an electrometric measuring device is not so high as to require elaborate shielding or ultra-high sensitivity devices of prohibitive cost.

The use of a mediator liquid having a relatively high dielectric constant requires that the liquid be chosen with considerable care, inasmuch as the characteristic of a high dielectric constant due to large dipole moments is frequently accompanied by the quality of comparatively good solubility in polar solvents, such as water. However, this is not always the case, and a number of mediators with appropriate properties are known. For example, some of the mediators suitable for use with ion-exchangers in the present invention are alcohols which preferably have long aliphatic chains in excess of eight carbon atoms, such as octyl and dodecyl alcohols; ketones such as 2-pentanone; aromatic compounds such as nitrobenzene, orthiodichlorbenzene; trialkylphosphonates; and a mixture containing high molecular weight hydrocarbon aliphatic compounds, such as mineral oils, in phosphonates or the like. It also appears that despite the desirability of high dielectric constant for the mediator, the ion selectivity exhibited by the exchanger dissolved in the mediator is greater when the dielectric constant is low. Thus, the selection of mediator characteristics will often be a compromise.

The ion-sensitive electrode assembly of the present invention, as noted in the generalized formula above, essentially includes the first solid electrode and the ion-exchange liquid. The latter, basically forms means for providing a barrier presenting a surface for defining an interface with the solution under test, the surface being a substantially continuous phase of the ion-exchange liquid such that the ion-exchange reaction can occur at the interface. The first solid electrode, such as an Ag-AgCl electrode is in electrical contact with the body of the barrier means.

Figure 1:
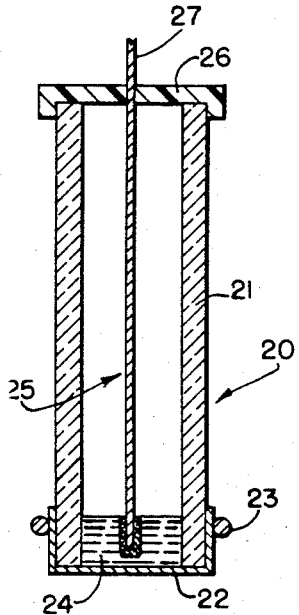
FIG. 1 is a diagrammatic cross sectional representation of an exemplary electrode formed according to the principles of the present invention.

Referring now to the drawings there will be seen in FIG. 1 a specific embodiment of ion-sensitive electrode 20 of the present invention and comprising electrically-insulating container means such as glass tube 21 having an opening at each end thereof. One end of tube 21 is tightly capped with a substantially chemically inert, thin (e.g. 1 mil) porous web or membrane 22 which typically can be made of such materials as cellophane, glass cloth, porous polyethylene or the like, held in place by suitable means such as O-ring 23. Disposed interiorly of tube 21 and in contact with membrane 22 is a continuous body of ion-exchanger liquid 24 which may be either a liquid ion-exchanger per se, or a normally solid ion-exchanger dissolved in a suitable solvent mediator or a normally liquid ion-exchanger diluted or attenuated with an appropriate mediator. Immersed directly in ion-exchange liquid 24 is electrode means 25, the portion thereof contacting the liquid 24 preferably being a reference electrode formed of a material such as a silver-silver chloride mass which ordinarily provides a stable junction potential. The end of tube 21 opposite membrane 22 may be capped by lid 26 which acts both as a closure and as a support for electrically conductive lead 27 which forms a portion of electrode means 25.

The electrode of FIG. 1 is employed by contacting the outer surface of membrane 22 with the test solution. Membrane 22 provides a mechanical support which retains liquid 24 within tube 21, but the membrane being porous provides support for the ion-exchanger liquid while also permitting the formation of the effective ion-exchange liquid-liquid interface between the ion-exchanger liquid and the test solution.

Figure 2:
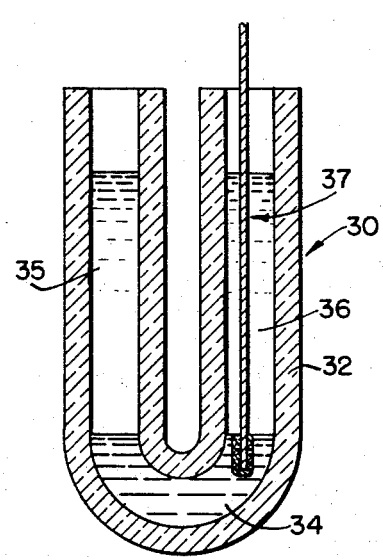
FIG. 2 is a cross-sectional, diagrammatic representation of another embodiment of an electrode formed according to the principles of the present invention.

As will be seen in FIG. 2, an alternative construction of an ion-sensitive electrode within the purview of the present invention, dispenses with any mechanical support such as a permeable membrane. As shown, the ion-sensitive electrode 30 of FIG. 2 includes electrically-insulating container means such as glass U-tube 32, having disposed therein sufficient ion-exchanger liquid 34 to fill the bottom and extend upwardly a short distance in both arms of tube 32 as the continuous body or phase shown. Disposed in one arm of tube 32 above the portion of liquid 34 therein is test solution 35 and a corresponding hydrostatically balancing quantity of inert (e.g. "deionized" water) liquid 36 is in the other arm above liquid 34. Immersed directly in the ion-exchange liquid is an electrode or electrically-conductive lead 37 such as the standard Ag-AgCl electrode. In this embodiment, of course, the liquid-liquid exchange interface is formed due to the immiscibility of solution 35 and liquid 34 and no membrane is required to support either fluid.

Figure 3:
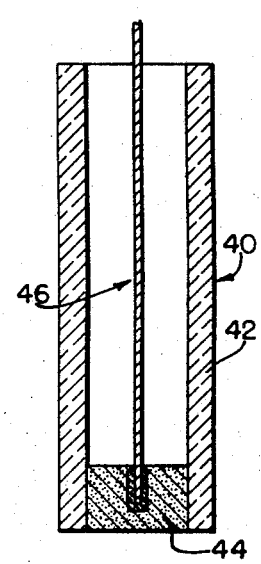
FIG. 3 is yet another diagrammatic cross-sectional representation of an electrode embodying the principles of the present invention.

Yet another embodiment contemplated by the present invention is shown in FIG. 3 wherein ion-sensitive electrode 40 comprises electrically insulating container means such as glass or polyethylene tube 42 having one end thereof capped or covered by mass 44. The latter is constituted of an ion-exchanger liquid which is mixed in sufficient proportion with substantially chemically inert, finely comminuted support material, such as colloidal silica, diatomaceous earth or the like, capable of forming a paste or gel in which the ion-exchanger liquid is nevertheless in continuous phase. Thus the ion-mobility in the mass is not severely impaired although the mass may appear quite stiff. Particularly suitable for a filler or support material are certain thixotropic agents such as the pyrogenic colloidal silica sold under the trade designation of Cab-O-Sil. Where the filler is such a thixotropic agent, the insertion and removal of mass 44 in its container is facilitated. Disposed within tube 42 is electrically conductive lead or electrode 46 contacting mass 44.

Figure 4:
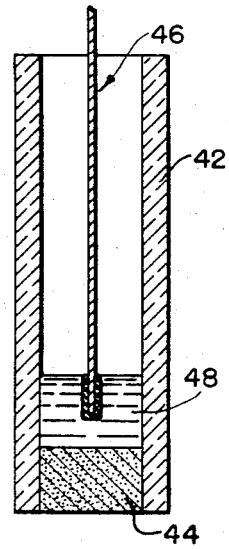
FIG. 4 is a diagrammatic showing of a variation of the embodiment of FIG. 3.

Each of the ion-sensitive electrodes thus described, when in use, should be electrically shielded, as by surrounding it with a grounded, electrically conductive mass or the like, as is well-known in the art. Additionally, each has been described as including an electrically-conductive lead physically contacting the exchanger material. This lead can be an Ag-AgCl electrode even though the exchanger material has neither silver nor chloride ions to set up the equilibrium with the electrode postulated by theory. Nor is it necessary to use an Ag-AgCl electrode, for a simple platinum wire will suffice in direct contact with the exchanger in most cases. Direct physical contact of an electrode or lead with the exchanger is not necessary either. Electrical contact can be maintained as shown in FIG. 4 (which is a variation of the embodiment of FIG. 3) simply by providing electrolytic solution 48 such as a standard 0.1 N HCl internally of tube 42 so as to be separated by mass 44 from any test solution in contact with the external (or "tube-end") surface of mass 44. The Ag-AgCl form of electrode 46 then is in physical contact only with the electrolytic solution.

Similar variations can be made with respect to the embodiments of FIG. 1 and FIG. 2. Specifically, an excellent electrode similar to that shown in FIG. 1 has been made using as mass 44, microporous (i.e. pores of about 1 to 2 microns) polyethylene membrane impregnated thoroughly with liquid ion-exchange material. This was accomplished by vacuum treating the membrane to evacuate the pores, immersing the membrane in ion-exchanger liquid, and then returning the membrane to atmospheric pressure while so immersed. No additional ion-exchanger liquid is then necessary, and contact between an internal reference electrode 46, e.g. a calomel electrode, and the membrane is accomplished with an ion-containing solution 48 such as saturated aqueous NaCl solution.

A number of ion-sensitive electrodes were formed from different anion-exchanger liquids composed of an anion exchanger material (e.g. quaternary ammonium salts, pyridinium derivatives, amine derivatives) having a long alkyl, aralkyl or aryl group, preferably of six or more carbon atoms, dissolved in or mixed with an organic mediator liquid. Each electrode exhibited selective behavior with respect to solutions of different anions in various concentrations as will be seen in the following examples:

EXAMPLE I

An electrode was made as shown in FIG. 3 using polyethylene tubing, an Ag-AgCl lead, and a barrier, formed of a secondary amine i.e. N-lauryl-N-trialkylmethylamine (sold under the trade designation Amberlite LA-2), mixed in substantially 1:4 ratio with n-decyl alcohol as a mediator and combined with sufficient colloidal silica to form a paste stuffed into one end of the tubing. The electrode was tested by contacting the paste barrier with a number of substantially pure aqueous solutions of different anions. Anion exchangers of the amine type are expected to react with alkaline solutions of pH as low as 9 or 10 to form neutral amines which are ineffective ion-exchangers, and the consequent loss in electrode selectivity is in practice observed. Thus, the pH of solutions of anions were adjusted to provide a pH range of between about 2 to 8. The following Table I shows the response of the electrode to each of a number of different ionci species, each in a corresponding aqueous solution containing 100 milliequivalents of the sodium salt of the noted anion per liter, the measurement in millivolts being referred to the response to the electrode to chloride ion as an arbitrary zero.

Table I

| Anion: | Response in mv. |
|---|---|
| Chloride | 0 |
| Bromide | −38 |
| Iodide | −78 |
| Fluoride | +35 |
| Sulfate | +23 |
| Carbonate | +10 |
| Nitrate | −45 |
| Acetate | +27 |
| Cyanide | −29 |

It will be seen that the response appears to vary according to the charge density of the ion, although the response to the nitrate ion seems anomalous. Variations in concentration of each solution indicated that the response of the electrode increased negatively by the factor $RT/nF$ for every ten-fold increase in the anionic activity (where R is the gas constant, T is the absolute temperature, $n$ is an integer representing the ion charge, and F is coulombs/equivalent) and thus was substantially Nernst type response between concentrations of about 1 M to $1 \times 10^{-4}$ M. Variations in pH between 2 and 8 had substantially no effect on the readings.

EXAMPLE II

An electrode was formed similar to that of Example I but the anion exchanger material employed was a quaternary ammonium salt, i.e. tetra n-heptyl ammonium iodide mixed with the same mediator in 1:4 proportion. When tested in a manner similar to the testing of the electrode of Example I, substantially the same results were found showing specific selectivities for each of various anions. For instance, for bromide and iodide ions, the readings (referred to zero for chloride) were respectively −25 mv. and −78 mv. It was further found that the response remained comparatively unaffected by variations in pH between about 2 to around 9 or 10; changes at the alkaline end of the range can apparently be ascribed to the presence of hydroxyl ions.

EXAMPLE III

An electrode was formed and tested as in Example II except that the anion-exchanger material employed was an alkyl pyridinium salt, i.e. N-cetyl pyridinium chloride. The response of this electrode on testing was very similar to the electrode of Example II. For example, the readings for bromide and iodide were respectively—25 mv. and −63 mv. referred to chloride as zero, and remained unchanged over about the same 2–10 pH range.

Ion-sensitive electrodes were made according to the present invention using a number of different cation-exchanger materials (e.g., organosulfonic acids, organophosphoric acids, their salts and esters, diketones, and hetercyclics such as 8-hydroxyquinoline) having massive enough structures (as by including for example, alkyl or alkaryl groups of six or more carbon atoms) to be soluble in an organic solvent yet substantially immiscible with or insoluble in water as the case may be, and thus mixed with or dissolved in an organic mediator of high dielectric constant which is also immiscible with water. Each such electrode exhibited seelctive behavior with respect to solutions of different cations in various concentrations and particularly with respect to divalent ions such as calcium, as shown in the following examples:

EXAMPLE IV

An electrode was formed as described in connection with the embodiment of FIG. 1, using a cellophane membrane and 1:4 proportions respectively of di-2-ethylhexyl phosphoric acid in n-decanol as the ion-exchanger liquid. The results of testing this electrode with substantially pure aqueous solutions of $Na^+$, $K^+$, $NH_4^+$, $Ba^{++}$, $Mg^{++}$ and $Ca^{++}$ in various concentrations are shown graphically in FIG. 5. Each curve (or point as the case may be) showing the potential found over the noted pH range (or at a particular pH value) is captioned according to the cation of interest in the solution and the number of moles per liter of the corresponding chloride in the solution. The responses appear remarkable in view of the relative lack of perturbation by change in pH (e.g. the 0.01 Ca curve) and particularly the marked preference of the electrode for a divalent ion such as $Ca^{++}$ over monovalent ions such as $Na^+$. Steady state conditions of potential were established for each solution in about three minutes or less, even after moving the electrode between two solutions differing in both the nature and concentrations of the cations of interest.

EXAMPLE V

An electrode was formed similar to that described in Example IV, but employed 1:3 proportions of di-2 ethylhexyl phosphoric acid in n-dodecyl alcohol. The results of testing on contact with a number of cationic solutions were substantially identical to those shown in FIG. 5.

A number of electrodes were made according to the description given in connection with the embodiment of FIG. 3, using colloidal silica as a thickening agent and a number of various ion-exchange materials is different mediators in various proportions as set forth in the following examples, VI to XII inclusive. In each example, readings in millivolts are given for test results achieved upon contact of the particular electrode with the solution noted at room temperature and at a pH of about 7. Each test solution is identified according to the concentration in milliequivalents of the chloride of the noted cation per liter. Each reading is referred to an arbitrary zero established by contact of the electrode with a 20 milliequivalents per liter solution of $CaCl_2$.

EXAMPLE VI

An electrode was formed of calcium di-2-ethylhexyl phosphate as the ion-exchanger in a mediator of n-decyl alcohol in the following proportions, and tested with the following results:

| Exchanger/mediator ratio | 2.0 Ca | 0.2 Ca | 20 Mg | 2.0 Mg | 1,000 Na | 100 Na |
|---|---|---|---|---|---|---|
| 1:4 | −26 |  | +2 |  | +23 | −23 |
| 1:16 | −28 | −52 | +4 | −10 |  | −5 |
| 1:100 | −33 | −58 | +3 | −37 |  | −19 |

The above data indicates the preference of the electrode for divalent over monovalent cations, particularly $Ca^{++}$ over $Na^+$, and this preference generally is unaffected by variations in exchanger/mediator ratios.

EXAMPLE VII

An electrode was formed of calcium di-2-ethylhexyl phosphate as the ion-exchanger in a mediator of dioctyl phenyl phosphonate in the following proportions, and tested with the following results:

| Exchanger/mediator ratio | Test solutions | | | | | | |
|---|---|---|---|---|---|---|---|
|  | 2.0 Ca | 0.2 Ca | 0.02 Ca | 20 Mg | 2.0 Mg | 1,000 Na | 100 Na |
| 1:4 | −22 |  |  | −15 | −34 | −26 | −32 |
| 1:8 | −24 | −50 |  | −30 |  |  | −35 |
| 1:100 | −28 | −55 | −82 | −42 | −53 | +22 | −17 |

Conclusions similar to those of Example VI can be drawn with respect to this data.

EXAMPLE VIII

An electrode was formed of 1,3-diphenyl-1,3-propanedione as the ion-exchanger in a 1:8 proportion in decyl alcohol, and tested with the following results:

| Test solution: | Reading |
| --- | --- |
| 2.0 Ca | −20 |
| 0.2 Ca | −43 |
| 0.02 Ca | −86 |
| 20 Mg | +10 |
| 2.0 Mg | −10 |
| 100 Na | +38 |

This electrode behaves similarly to the electrodes of Examples VI and VII except that the $Na^+$ sensitivity here has increased relative to the divalent ions.

EXAMPLE IX

An electrode was formed of stearyl acid phosphate as the ion-exchanger in 1:8 proportion in 2:1 octyl-dodecyl alcohol, and tested with the following results:

| Test solution: | Reading |
| --- | --- |
| 2.0 Ca | −24 |
| 0.2 Ca | −51 |
| 0.02 Ca | −67 |
| 20 Mg | −27 |
| 2.0 Mg | −37 |
| 1000 Na | −52 |
| 100 Na | −72 |

This electrode data shows particularly enhanced $Ca^{++}$ selectivity.

EXAMPLE X

An electrode was formed of bis (2-ethylhexyl) hydrogen phosphite as the ion-exchanger in 1:8 proportion in n-dodecyl alcohol, and tested with the following results:

| Test solution: | Reading |
| --- | --- |
| 2.0 Ca | −24 |
| 0.2 Ca | −50 |
| 0.02 Ca | −60 |
| 20 Mg | 0 |
| 2.0 Mg | −24 |
| 100 Na | −8 |

EXAMPLE XI

An electrode was formed of perfluoroctanoic acid as the ion-exchanger in 1:4 proportion in n-decyl alcohol, and tested with the following results:

| Test solution: | Reading |
| --- | --- |
| 2.0 Ca | −30 |
| 0.2 Ca | −60 |
| 0.02 Ca | −84 |
| 20 Mg | +3 |
| 2.0 Mg | −30 |
| 100 Na | −7 |

EXAMPLE XII

An electrode was formed of 4,4,4-trifluoro-1(2-thienyl)-1,3-butanedione as the ion-exchanger in 1:8 proportion in dicotyl phenyl phosphonate, and tested with the following results:

| Test solution: | Reading |
| --- | --- |
| 2.0 Ca | −32 |
| 0.2 Ca | −68 |
| 0.02 Ca | −93 |
| 20 Mg | −50 |
| 2.0 Mg | −60 |
| 1000 Na | −62 |
| 100 Na | −80 |

Referring now to FIG. 6, there will be seen an embodiment of the present invention particulraly adapted for use as, for example, a water-hardness tester. As shown, ion-sensitive electrode 50, of the type hereinbefore described for example with reference to FIG. 3, is connected by lead 52 to one input terminal 54 of a high-impedance input, direct current, inverting amplifier 56 of known type such as any of a number of pH amplifiers. Reference electrode 58, such as a standard calomel electrode, is connected by lead 60 through resistor 62 to one input terminal of a meter such as milliammeter 64, the other terminal of meter 64 being connected to a first output terminal 66 of amplifier 56. Reference electrode 58 is also connected directly to second input terminal 68 of amplifier 56, the other amplifier output terminal 70 being connected to the one input terminal of meter 64.

The circuit of FIG. 6 is intended to provide a negative feedback in that, in operation when both electrodes 50 and 58 are in contact with a test solution such as shown at 72, they constitute an electrochemical cell which generates an E.M.F., $E_1$ of a first polarity between the electrodes.

Current flow through resistor 62 creates an IR drop or $E_2$, of polarity opposite to $E_1$. The difference between the magnitudes of voltages E, and $E_2$ is fed into the input of amplifier 56 to provide an output current which tends to make $E_1 = E_2$. Such circuit is well known in the art and needs no further description here.

Significantly, the current through resistor 62, measured by meter 64 is quite accurately linear with respect to the changes in the e.m.f. of the cell, and these changes quite accurately reflect, in a log-linear manner, corresponding changes in concentration of divalent cations, particularly $Ca^{++}$, over a rather wide range of concentrations. Inasmuch as 1 milliequivalent/liter of soluble Ca salt is approximately the same as 4 p.p.m., meter 64 is preferably calibrated directly in parts by weight, such as p.p.m., and a direct electrical readout, for example, of calcium concentration, becomes available.

Since certain changes may be made in the above processes and apparatus without departing from the scope of the invention herein involved it is intended that all matter contained in the above description or shown in the accompanying drawing shall be interpreted in an illustrative and not in a limiting sense.

What is claimed is:

1. An electrode for measuring the concentration of ionic species in an aqueous solution comprising:
    (a) a liquid organic phase containing an organic ion exchange material capable of exchanging ions with the solution and said organic phase being substantially immiscible with the aqueous solution;
    (b) a means for so containing the organic phase, as to provide an interface for ion exchange contact between said organic phase and the aqueous solution; and
    (c) an internal reference electrode element in electrical contact with the organic phase.

2. An electrode as defined in claim 1 wherein said material is a normally liquid anion-exchange material.

3. An electrode as defined in claim 2 wherein said liquid is selected from the group consisting of primary, secondary, and tertiary amines.

4. An electrode as defined in claim 1 wherein said material is a normally liquid cation-exchange material.

5. An electrode as defined in claim 4 wherein said material is selected from the group consisting of organophosphoric acids, carboxylic acids, perfluorocarboxylic acids and salts thereof.

6. The electrode as defined by claim 1 wherein said liquid organic phase consists essentially of an organic ion exchange material dissolved in an organic solvent.

7. An electrode as defined in claim 6 wherein said material is a normally solid ion-exchange material dissolved in said solvent.

8. An electrode as defined in claim 6 wherein said material is a normally liquid ion-exchange material miscible with said solvent.

9. An electrode as defined in claim 8 wherein said material is a cation-exchange material.

10. An electrode as defined in claim 8 wherein said material is an anion-exchange material.

11. An electrode as defined in claim 6 wherein said organic solvent is an alcohol having an aliphatic chain of at least 8 carbon atoms.

12. The electrode as defined by claim 11 wherein said material is N-lauryl-N-trialkylmethylamine and said solvent is n-lauryl alcohol.

13. The electrode as defined in claim 6 wherein said solvent is a non-acidic phosphonate.

14. The electrode as defined by claim 13 wherein said material is calcium di-2-ethylhexyl phosphate and said solvent is dioctyl phenyl phosphonate.

15. An electrode as defined in claim 1 wherein the aqueous solution is receivable in the container, the interface being formed in the container.

16. An electrode as defined by claim 1 wherein a porous membrane is associated with the container, the interface being formed at said membrane.

17. An electrode as defined in claim 1 wherein the organic phase is mixed with a finely comminuted material substantially chemically inert with respect to both said organic phase and said aqueous solution.

18. An electrode as defined in claim 17 wherein said comminuted material is colloidal silica.

19. An electrode as defined in claim 17 wherein said comminuted material is of such nature and is mixed with said liquid in such proportion as to provide a thixotropic mixture.

20. An electrode assembly for sensing concentrations of ions in an aqueous solution, said assembly comprising, in combination,
a hollow container having an opening therein;
a membrane disposed across said opening for providing on the outer surface of said membrane an interface adapted to contact said solution;
a liquid organic phase containing an organic ion exchange material substantially immiscible with said solution and capable of reacting at said interface with said solution so as to exchange ions therewith;
an electrically conductive solution immiscible with said organic phase and disposed within said container in contact with said organic phase; and
a reference electrode having a stable contact potential and being in electrical contact with said organic phase through said conductive solution.

21. Method of measuring concentration of an ionic species in an aqueous solution comprising the steps of:
forming an interface between said solution and a liquid organic phase containing an organic ion-exchange material, said phase being substantially immiscible with said solution and capable of exchanging at said interface ions for said species;
contacting said material with an electrically conductive lead; contacting said solution with a reference electrode; and measuring any potential developed between said electrode and said interface.

22. Method as defined in claim 21 wherein said organic phase is an organic ion-exchange material dissolved in an organic solvent, said material being substantially insoluble in said solution.

23. The method as defined by claim 22 wherein said species is alkaline earth metal.

24. The method as defined by claim 23 wherein said species is calcium.

25. The method as defined in claim 23 wherein said species is magnesium.

References Cited

UNITED STATES PATENTS 2,913,386  11/1959  Clark _____ 204—195

OTHER REFERENCES

"Journal of the Am. Chem. Soc.," vol. 86, May 5, 1964, pp. 1901–1902.

Lewis et al., "Journal of the Electrochemical Soc.," vol. 106, No. 4, April 1959, pp. 347–354.

JOHN H. MACK, *Primary Examiner.*

T. TUNG, *Assistant Examiner.*

U.S. Cl. X.R.
204—195, 295, 296